(12) United States Patent
Chen et al.

(10) Patent No.: US 10,945,214 B2
(45) Date of Patent: Mar. 9, 2021

(54) UPLINK POWER CONTROL

(71) Applicant: QUALCOMM Incorporated, San Diego, CA (US)

(72) Inventors: Shengbo Chen, San Diego, CA (US); Tao Luo, San Diego, CA (US); Sumeeth Nagaraja, San Diego, CA (US); Xiao Feng Wang, San Diego, CA (US); Sony Akkarakaran, Poway, CA (US); Makesh Pravin John Wilson, San Diego, CA (US); Wooseok Nam, San Diego, CA (US); Kaushik Chakraborty, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 16/104,369

(22) Filed: Aug. 17, 2018

(65) Prior Publication Data

US 2019/0059058 A1    Feb. 21, 2019

Related U.S. Application Data

(60) Provisional application No. 62/547,333, filed on Aug. 18, 2017.

(51) Int. Cl.
*H04J 1/16* (2006.01)
*H04L 1/00* (2006.01)
(Continued)

(52) U.S. Cl.
CPC ....... *H04W 52/146* (2013.01); *H04L 41/0803* (2013.01); *H04W 52/18* (2013.01);
(Continued)

(58) Field of Classification Search
CPC . H04W 52/146; H04W 52/18; H04W 52/242; H04W 52/08; H04W 52/36; H04W 41/0803; H04W 88/02
See application file for complete search history.

(56) References Cited

U.S. PATENT DOCUMENTS

2006/0270434 A1* 11/2006 Iacono ................. H04B 7/0604
                                                        455/522
2013/0102345 A1*  4/2013 Jung ..................... H04B 7/0456
                                                        455/513
(Continued)

OTHER PUBLICATIONS

Samsung (R1-1702964, UL power control Aspects, Feb. 13-17, 2017). (Year: 2017).*
(Continued)

*Primary Examiner* — Maharishi V Khirodhar
(74) *Attorney, Agent, or Firm* — Patterson & Sheridan, LLP

(57) ABSTRACT

Certain aspects of the present disclosure relate to methods and apparatus for uplink power control. Certain aspects provide a method for performing uplink power control at a base station (BS). The method includes determining a first configuration of one or more parameters for uplink power control at a user equipment (UE) based on a first spatial beam selected, from a plurality of spatial beams, for uplink communication of the UE. The method further includes transmitting a first indication of the first configuration to the UE.

28 Claims, 8 Drawing Sheets

(51) Int. Cl.

| | | |
|---|---|---|
| *H04L 12/26* | (2006.01) | |
| *H04L 12/28* | (2006.01) | |
| *H04W 52/14* | (2009.01) | |
| *H04W 52/24* | (2009.01) | |
| *H04W 52/18* | (2009.01) | |
| *H04L 12/24* | (2006.01) | |
| *H04W 52/08* | (2009.01) | |
| *H04W 52/36* | (2009.01) | |
| *H04W 88/02* | (2009.01) | |

(52) U.S. Cl.
CPC .......... *H04W 52/242* (2013.01); *H04W 52/08* (2013.01); *H04W 52/36* (2013.01); *H04W 88/02* (2013.01)

(56) References Cited

U.S. PATENT DOCUMENTS

| | | | | |
|---|---|---|---|---|
| 2013/0229307 | A1* | 9/2013 | Chang | H01Q 25/00 342/372 |
| 2015/0215873 | A1* | 7/2015 | Jeong | H04W 52/146 455/522 |
| 2016/0127086 | A1* | 5/2016 | Choi | H04W 52/325 370/331 |
| 2018/0192375 | A1* | 7/2018 | Xia | H04B 7/088 |
| 2019/0141639 | A1* | 5/2019 | Rahman | H04W 52/22 |
| 2019/0159080 | A1* | 5/2019 | Zhang | H04W 36/00 |
| 2019/0268852 | A1* | 8/2019 | Ryu | H04W 52/14 |
| 2019/0357153 | A1* | 11/2019 | Zhang | H04W 52/16 |
| 2020/0045684 | A1* | 2/2020 | Futaki | H04W 72/085 |
| 2020/0112347 | A1* | 4/2020 | Fukui | H04W 52/146 |
| 2020/0112993 | A1* | 4/2020 | Tsai | H04W 72/005 |
| 2020/0178350 | A1* | 6/2020 | Miao | H04W 88/06 |
| 2020/0212987 | A1* | 7/2020 | Priyanto | H04W 52/146 |

OTHER PUBLICATIONS

ZTE RS-1704418, "discussion of UL power control for NR", Apr. 3-7, 2017 (Year: 2017).*
Ericsson (R2-168719, Nov. 14-18, 2016, inter cell and intra-cell mobility in multi-TRP deployments). (Year: 2016).*
Nokia (R2-1700112, "Mobility measurement in connected mode", Jan. 17-19, 2017). (Year: 2017).*
Intel Corporation (R1-166563, "On the need of new QCL parameters in NR", Aug. 22-26, 2016). (Year: 2016).*
Fujitsu (R1-123302, Discussion of SRS power control, Aug. 13-17, 2012 (Year: 2012).*
Catt: "RACH Power Control and Power Ramping Procedure", 3GPP Draft, R1-1711617_RACH_Power Control (Revision of R1-1710034), 3rd Generation Partnership Project (3GPP), Mobile Competence Centre, 650, Route Des Lucioles, F-06921 Sophia-Antipolis Cedex, FRA vol. RAN WG1, No. Qingdao, China, 20170627-20170630, Jun. 26, 2017 (Jun. 26, 2017), XP051300787, pp. 1-5, Retrieved from the Internet: URL:http://www.3gpp.org/ftp/Meetings_3GPPSync/RAN1/Docs/ [retrieved on Jun. 26, 2017].
CMCC: "Beam Specific UL Power Control Procedure", 3GPP Draft; R1-1708404, 3rd Generation Partnership Project (3GPP), Mobile Competence Centre, 650, Route Des Lucioles, F-06921 Sophia-Antipolis Cedex, France vol. RAN WG1, No. Hangzhou, 20170515-20170519, May 14, 2017 (May 14, 2017), XP051273597, pp. 1-4, Retrieved from the Internet: URL:http://www.3gpp.org/ftp/Meetings_3GPP SYNC/RAN1/Docs/ [retrieved on May 14, 2017].
International Search Report and Written Opinion—PCT/US2018/047004—ISA/EPO—dated Nov. 2, 2018.
ZTE: "On NR Power Control", 3GPP Draft, R1-1710209 on NR Power Control, 3rd Generation Partnership Project (3GPP), Mobile Competence Centre, 650, Route Des Lucioles, F-06921 Sophia-Antipolis Cedex, France vol. RAN NG1, No. Qingdao, P.R. China, 20170627-20170630, Jun. 26, 2017 (Jun. 26, 2017), XP051299430, 4 Pages, Retrieved from the Internet: URL:http://www.3gpp.org/ftp/Meetings_3GPP SYNC/RAN1/Docs/ [retrieved on Jun. 26, 2017].

* cited by examiner

UPLINK POWER CONTROL

CROSS-REFERENCE TO RELATED APPLICATIONS

This application claims the benefit of U.S. Provisional Patent No. 62/547,333, filed Aug. 18, 2017. The content of the provisional application is hereby incorporated by reference in its entirety.

INTRODUCTION

The present disclosure relates generally to communication systems and methods and apparatus for uplink power control.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for performing uplink power control at a base station (BS). The method includes determining a first configuration of one or more parameters for uplink power control at a user equipment (UE) based on a first spatial beam selected, from a plurality of spatial beams, for uplink communication of the UE. The method further includes transmitting a first indication of the first configuration to the UE.

Certain aspects provide a base station (BS) including a memory and a processor. The processor is configured to determine a first configuration of one or more parameters for uplink power control at a user equipment (UE) based on a first spatial beam selected, from a plurality of spatial beams, for uplink communication of the UE. The processor is further configured to transmit a first indication of the first configuration to the UE.

Certain aspects provide a base station (BS) including means for determining a first configuration of one or more parameters for uplink power control at a user equipment (UE) based on a first spatial beam selected, from a plurality of spatial beams, for uplink communication of the UE. The base station further includes means for transmitting a first indication of the first configuration to the UE.

Certain aspects provide a non-transitory computer readable storage medium that stores instructions that when executed by a base station (BS) causes the base station to perform a method for performing uplink power control at the BS. The method includes determining a first configuration of one or more parameters for uplink power control at a user equipment (UE) based on a first spatial beam selected, from a plurality of spatial beams, for uplink communication of the UE. The method further includes transmitting a first indication of the first configuration to the UE.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
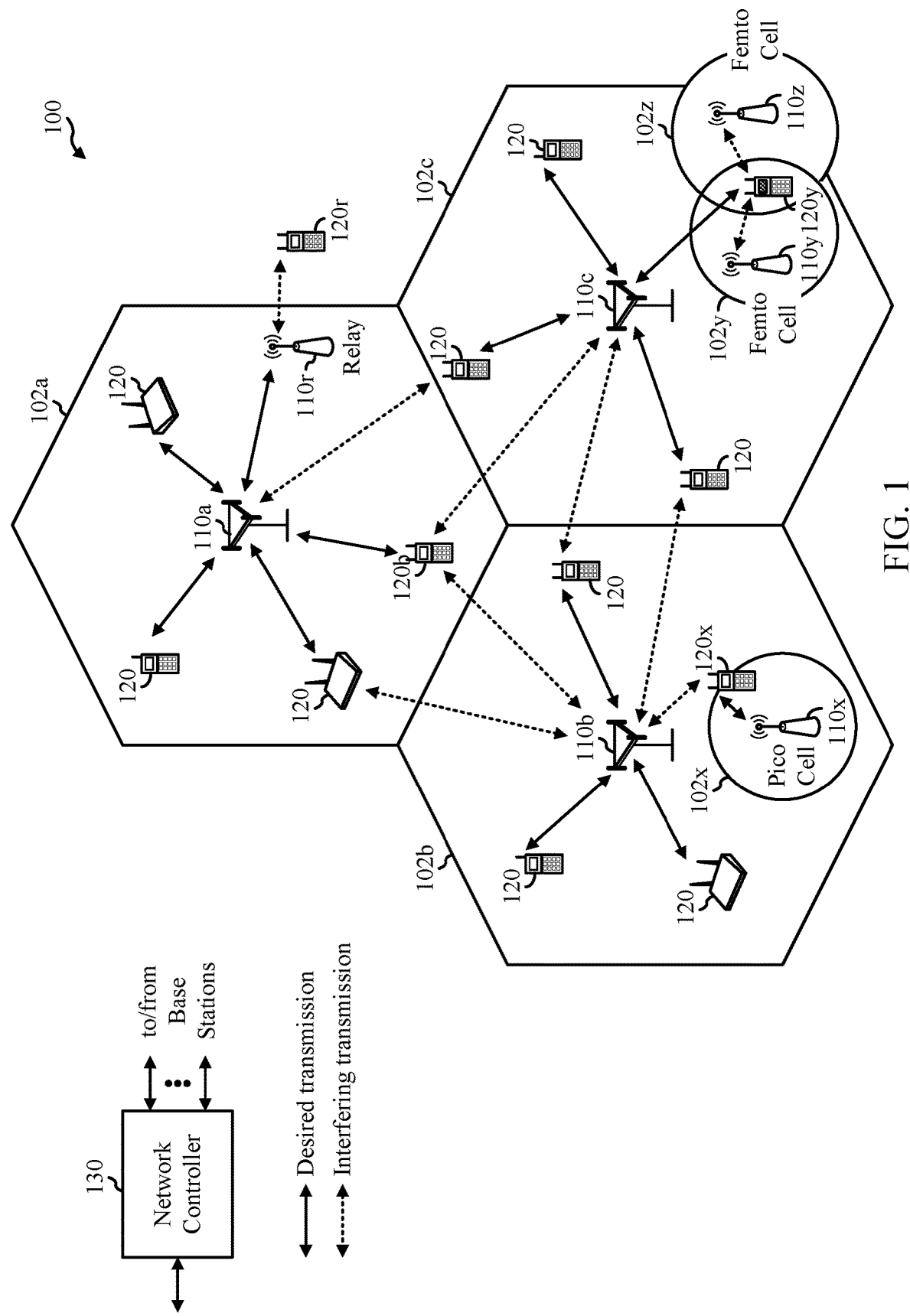
FIG. 1 is a block diagram conceptually illustrating an example telecommunications system, in accordance with certain aspects of the present disclosure.

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

Aspects of the present disclosure relate to systems and method for uplink power control. For example, a user equipment (UE) may be configured to transmit signals to a base station (BS) on an uplink. The uplink power with which the UE transmits signals carrying data, control information, reference signals, or the like to the BS may be controlled as part of an uplink power control scheme. In particular, the uplink power for transmitting by the UE may be controlled to ensure that signals are received with sufficient strength (e.g., with a threshold quality, such as signal to interference and noise ratio (SINR)) at the BS that the information or data carried in the signals can be retrieved from the signals. Further, the uplink power for transmitting by the UE may be controlled to mitigate (e.g., minimize) interference to other devices (e.g., UEs and BSs in the same or different cells) that may also receive the signals (e.g., as interference).

In certain aspects, a UE may communicate on the uplink with one or more BSs or transmission reception points (TRPs) using beamforming where the UE spatially directs transmissions as different beams in one or more directions to the one or more transmission reception points. In certain aspects, one or more parameters used for performing uplink control may be configured on a per beam basis, or a per cell basis (e.g., per TRP basis) according to the techniques discussed herein.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed. For example, in certain aspects, a BS 110 configures one or more parameters used for performing uplink control on a per beam basis, or a per cell basis (e.g., per TRP basis) according to the techniques discussed herein.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, gNB, gNodeB, Node B, 5G NB, AP, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

In certain aspects, as shown, a UE 120 may be configured to transmit signals on an uplink to the BS 110. The BS 110 may be configured to configure the UE 120 to perform uplink power control on the uplink, according to the techniques discussed herein.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
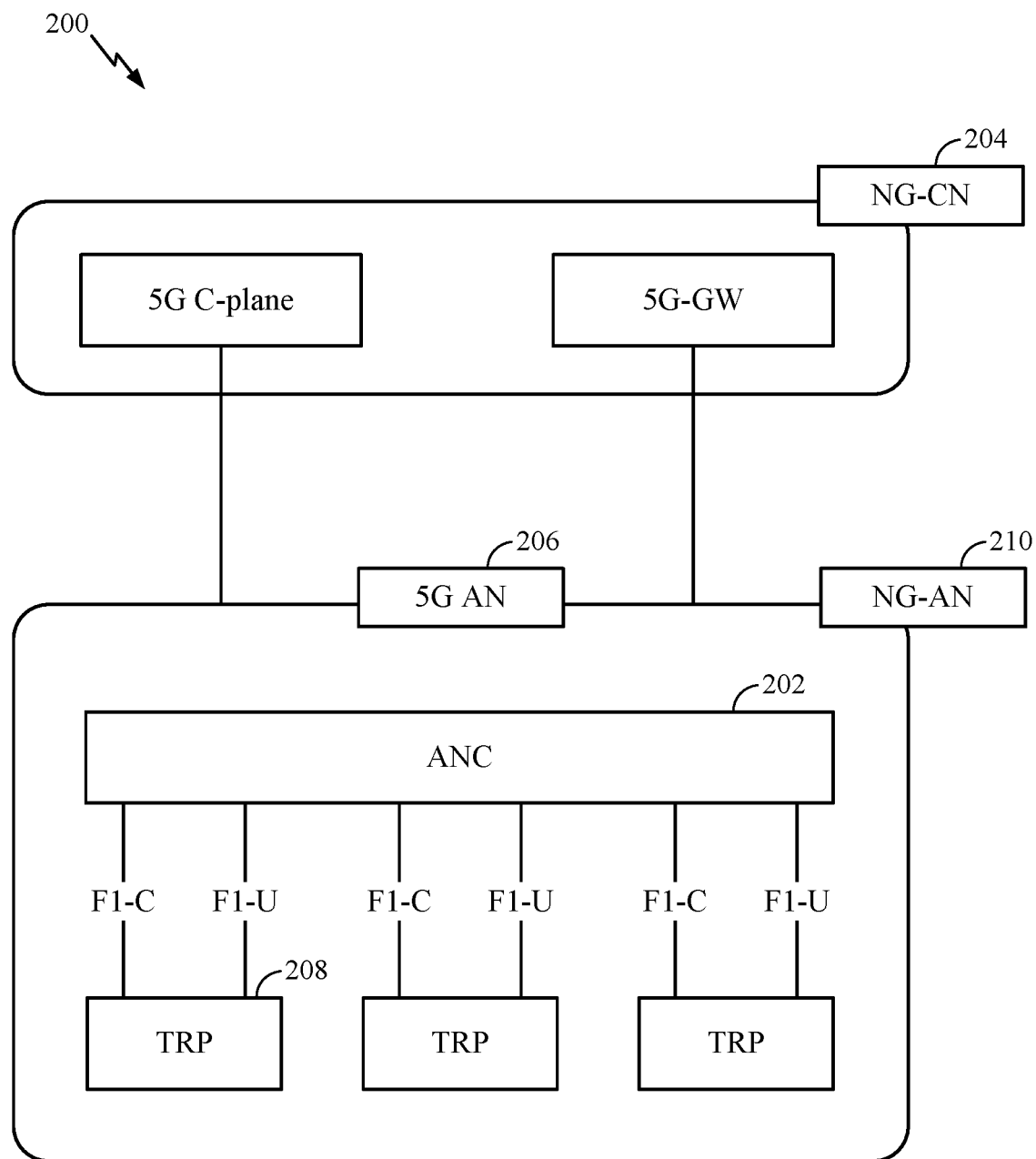
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
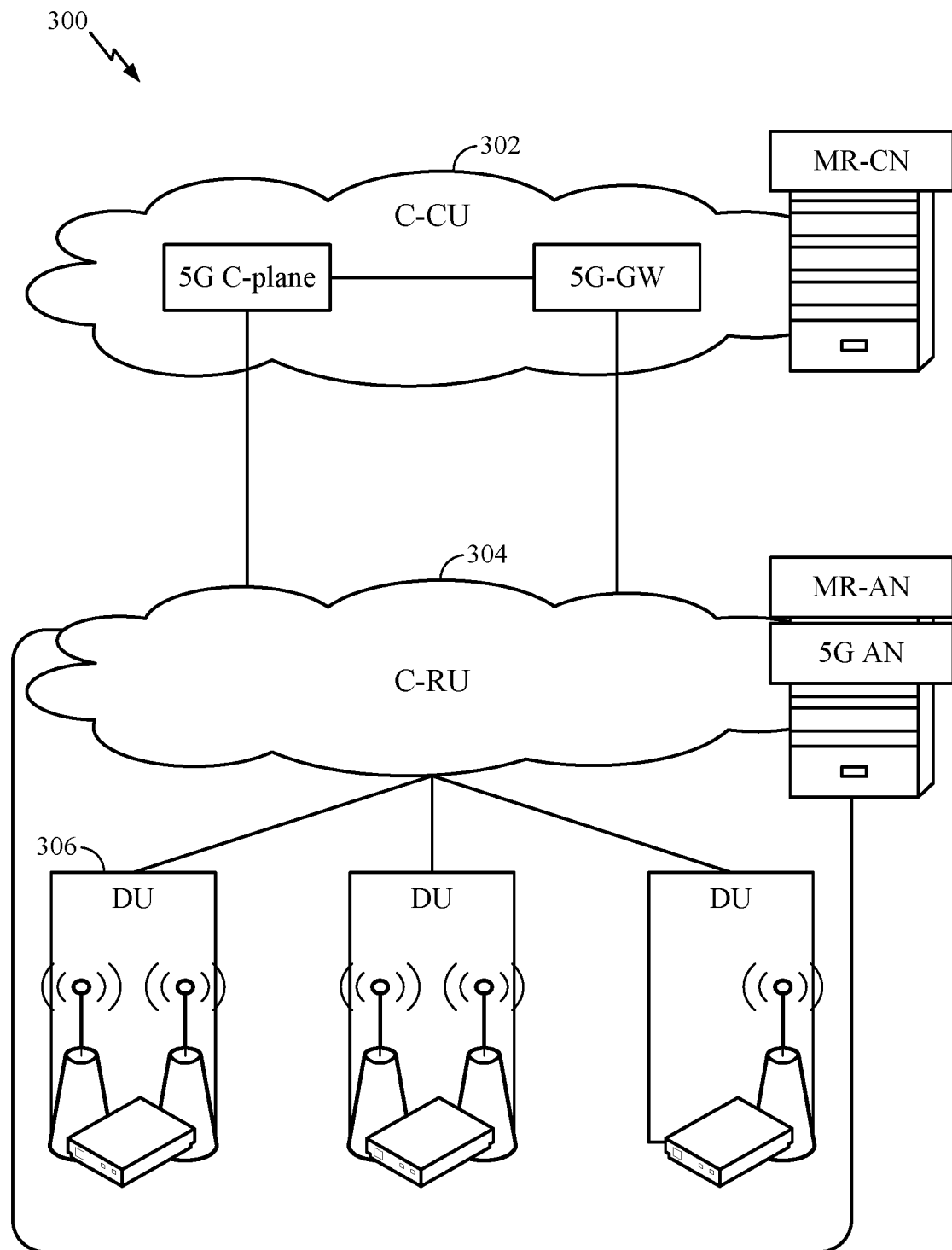
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
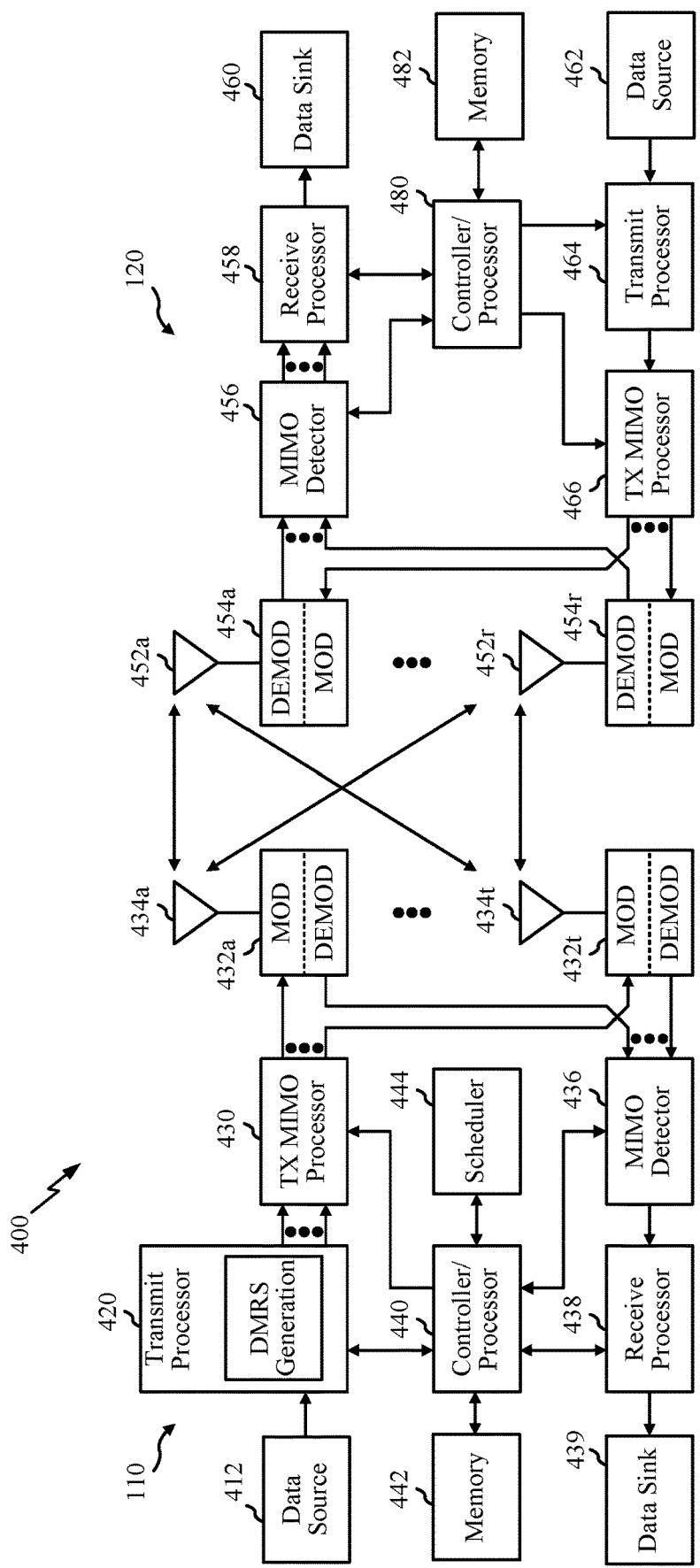
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, DMRS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
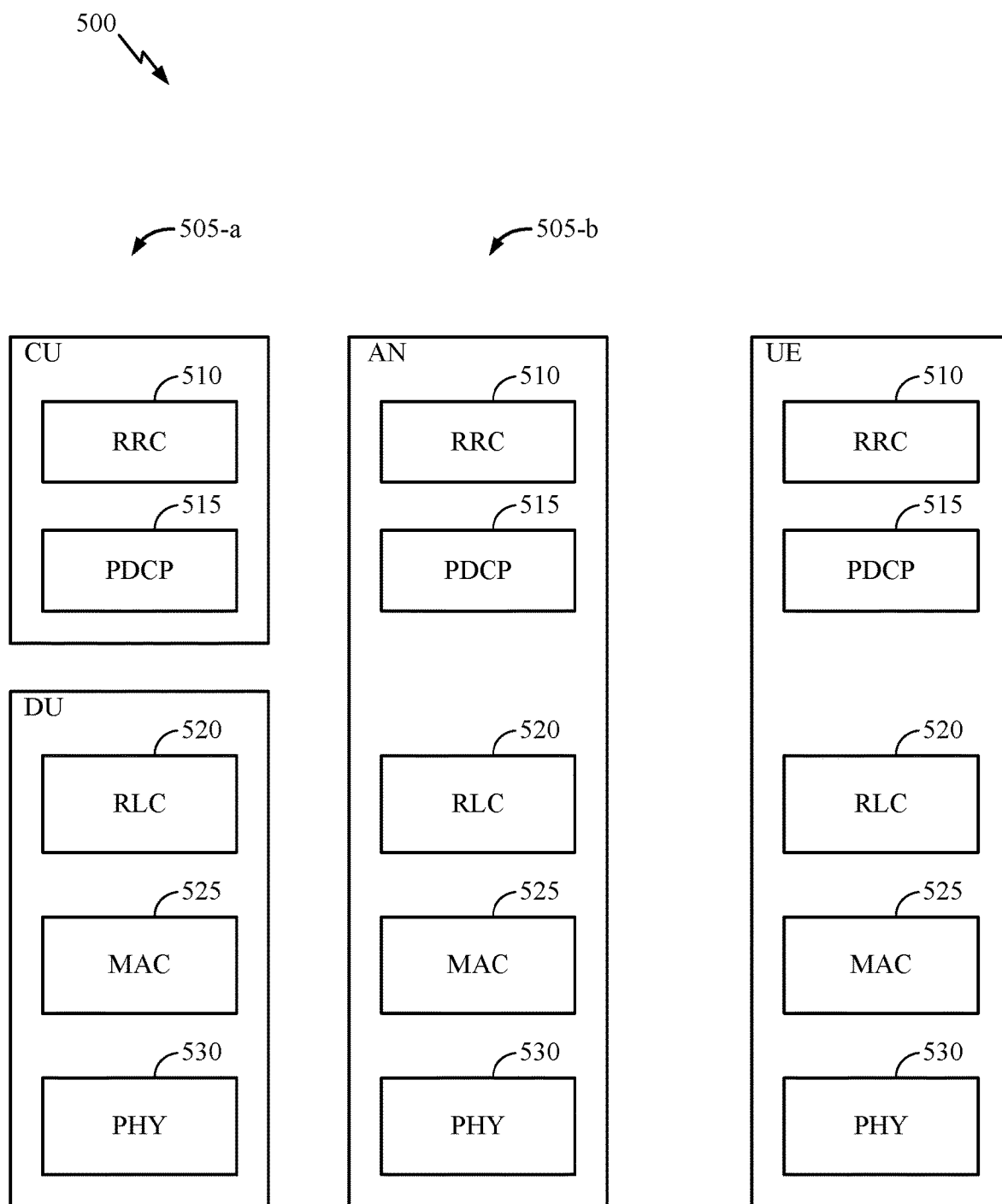
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
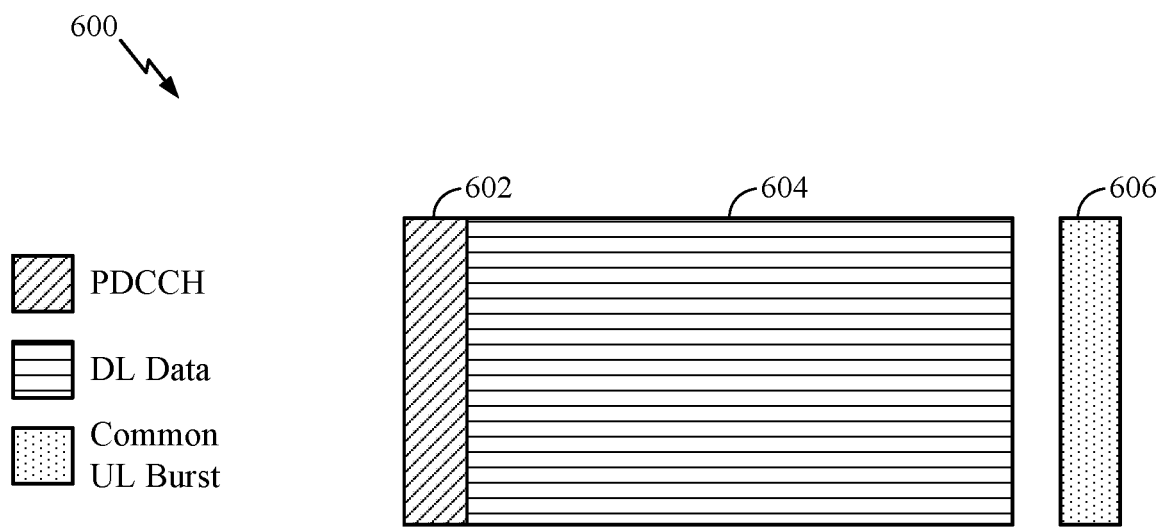
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
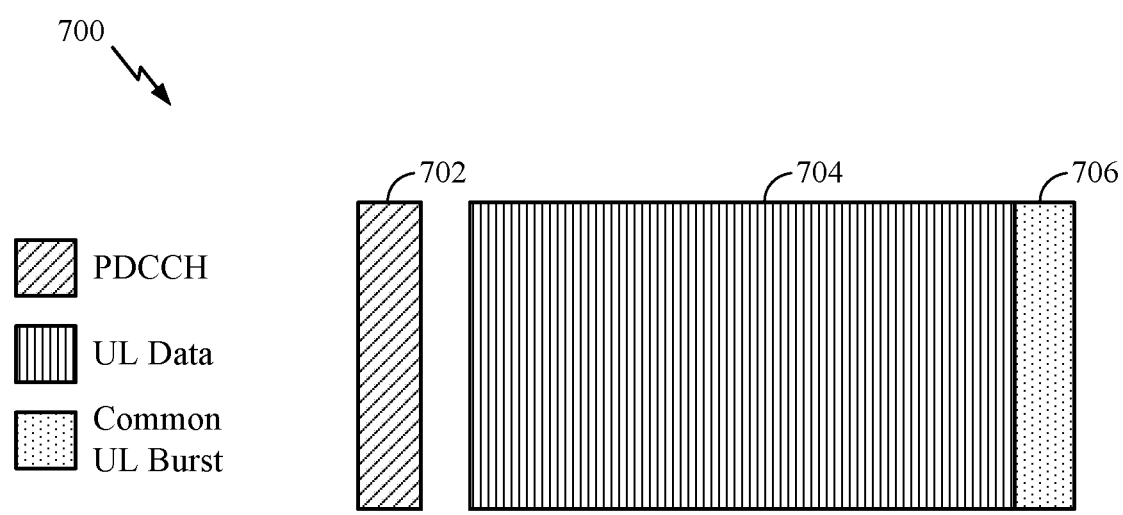
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Uplink Power Control

Aspects of the present disclosure relate to uplink power control of transmission of a UE to a BS on an uplink. For example, a UE 120 may be connected to BS 110 and configured to transmit signals to the BS 110 on one or more uplink channels (e.g., PUSCH, PUCCH, SRS, etc.). In certain aspects, the UE 120 may be configured to perform power control for transmissions on the uplink to the BS 110 (i.e., uplink power control) based on one or more parameters.

For example, on the PUSCH, UE 120 may be configured to use the following equation for power control:

$$P_{PUSCH}(i) = \min\{P_{CMAX}, 10 \log_{10}(M_{PUSCH}(i)) + P_{O\_PUSCH}(j) + \alpha(j) \cdot PL + \Delta_{TF}(i) + f(i)\} \quad (1)$$

Here, (i) refers to a particular subframe on the uplink for which the equation applies. $P_{PUSCH}(i)$ refers to the transmit power used by the UE 120 to transmit to the BS 110 on the PUSCH. The parameter $P_{CMAX}$ refers to the maximum transmission power the UE 120 is configured to use. The parameter $M_{PUSCH}(i)$ refers to the bandwidth of the PUSCH resource assignment (e.g., resource blocks (RBs)) allocated to the UE 120 for transmission on the PUSCH. The parameter $P_{O\_PUSCH}(j)$ (an example of a $P_0$ parameter) refers to a target received power (e.g., when assuming 0 dB of path loss (PL)) at the BS 110 for signals sent from the UE 120 to the BS 110 on the PUSCH (e.g., j=0—for a transmission corresponding to a semi persistent grant (SPS); j=1—for a transmission corresponding to a dynamic scheduled grant; j=2 for a transmission corresponding to a random access response (RAR) grant). The parameter α(j) refers to a compensation factor (e.g., PL compensation factor). The parameter PL refers to the downlink path loss estimate as calculated by UE 120 based on reference symbol received power (RSRP) calculated for one or more reference signals (RSs) transmitted by the BS 110 to the UE 120 on the downlink. The parameter $\Delta_{TF}(i)$ refers to a corrective factor that depends on a modulation coding scheme (MCS). The parameter $f(i)$ refers to a closed loop component that uses feedback from the UE 120 to modify the transmit power (an example of a function for closed loop control for changing a power level used for transmitting by the UE on the uplink based on feedback from the BS).

In another example, on the PUCCH, UE 120 may be configured to use the following equation for power control:

$$P_{PUCCH}(i) = \min\{P_{CMAX}, h(CQI, HARQ, SR) + P_{O\_PUCCH} + PL + \Delta_F(F) + \Delta_{TxD}(F') + g(i)\} \quad (2)$$

Here, (i) refers to a particular subframe on the uplink for which the equation applies. $P_{PUCCH}(i)$ refers to the transmit power used by the UE 120 to transmit to the BS 110 on the PUCCH. The parameter $P_{CMAX}$ refers to the maximum transmission power the UE 120 is configured to use. The parameter h(CQI,HARQ,SR) refers to a specific number based on the number of channel quality indicator (CQI) bits, number of HARQ value, and number of scheduling request (SR). The parameter $P_{O\_PUCCH}$ (an example of a $P_0$ parameter) refers to a target received power (e.g., when assuming 0 dB of path loss (PL)) at the BS 110 for signals sent from the UE 120 to the BS 110 on the PUCCH. The parameter PL refers to the downlink path loss estimate as calculated by UE 120 based on reference symbol received power (RSRP) calculated for one or more reference signals (RSs) transmit-ted by the BS 110 to the UE 120 on the downlink. The parameter $\Delta_F(F)$ refers to a power offset based on the PUCCH format. The parameter $\Delta_{TxD}(F')$ refers to a power offset based on the PUCCH transmit diversity. The parameter g(i) refers to a closed loop component that uses feedback from the UE 120 to modify the transmit power (an example of a function for closed loop control for changing a power level used for transmitting by the UE on the uplink based on feedback from the BS).

In another example, for SRS transmission, UE 120 may be configured to use the following equation for power control:

$$P_{SRS}(i) = \min\{P_{CMAX}, 10 \log_{10}(M_{SRS}(i)) + P_{O\_SRS}(j) + \alpha(j)PL + P_{SRS\_offset} + f(i)\} \quad (3)$$

Here, (i) refers to a particular subframe on the uplink for which the equation applies. $P_{SRS}(i)$ refers to the transmit power used by the UE 120 to transmit SRS to the BS 110 on the uplink. The parameter $P_{CMAX}$ refers to the maximum transmission power the UE 120 is configured to use. The parameter $M_{SRS}(i)$ refers to the bandwidth of the resource assignment (e.g., resource blocks (RBs)) allocated to the UE 120 for transmission of SRS. The parameter $P_{O\_SRS}(j)$ (an example of a $P_0$ parameter) refers to a target received power (e.g., when assuming 0 dB of path loss (PL)) at the BS 110 for SRS sent from the UE 120 to the BS 110 (e.g., j=0—for a transmission corresponding to a semi persistent grant (SPS); j=1—for a transmission corresponding to a dynamic scheduled grant; j=2 for a transmission corresponding to a random access response (RAR) grant). The parameter α(j) refers to a compensation factor (e.g., PL compensation factor). The parameter PL refers to the downlink path loss estimate as calculated by UE 120 based on reference symbol received power (RSRP) calculated for one or more reference signals (RSs) transmitted by the BS 110 to the UE 120 on the downlink. The parameter $_{SRS\_offset}$ refers to a power offset. The parameter $f(i)$ refers to a closed loop component that uses feedback from the UE 120 to modify the transmit power (an example of a function for closed loop control for changing a power level used for transmitting by the UE on the uplink based on feedback from the BS).

In certain aspects, in closed loop power control function $f(i)$ for PUSCH (and similarly for SRS) accumulation can be enabled or disabled, meaning that the power control function either accumulates values from previous subframes (e.g., $f(i)=f(i-1)+\delta(i-K)$, where $\delta(i-K)$ is a transmit power control (TPC) command received by the UE 120 from BS 110 in subframe i-K) or does not accumulate values from previous subframes (e.g., $f(i)=\delta(i-K)$).

In certain aspects, in closed loop power control function g(i) for PUCCH accumulation may be enabled or disabled $$\text{(e.g., } g(i) = g(i-1) + \sum_{0}^{M-1} \delta(i - K)\text{,}$$

where M is the number of HARQ-ACK bundling).

The UE 120 may utilize beamforming to transmit signals to the BS 110 (e.g., to one or more TRPs of the BS 110). Accordingly, the UE 120 may transmit a signal as a directed beam (also referred to as spatial beams) to the BS 110. Similarly, the BS 110 may transmit signals to the UE 120 on one or more downlink channels (e.g., PDSCH, PDCCH, etc.). The BS 110 may also utilize beamforming to transmit signals as beams to the UE 120.

Uplink power control for multiple beams may present certain challenges. For example, the target SINR for transmissions on the uplink at the BS 110 may be different for different beams (e.g., be beam specific (e.g., per multi-panel, TRP, BS, etc.)). In addition, path loss estimates at the UE 120 may be different for different beams (e.g., be beam specific). In certain aspects, UL and DL may be reciprocal so that downlink RS may be used for uplink PL estimation. Further, in certain aspects, interference may be different for different beams (e.g., be beam specific). Accordingly, certain techniques herein provide for one or more parameters used for performing uplink control to be configured on a per beam basis, due to the beam specific nature of certain parameters as discussed.

As discussed, PL estimates are made at the UE 120 based on RS transmitted by the BS 110. In certain aspects, the transmit power used by the BS 110 for a given RS may be based on or account for the transmission strategy from the BS 110 to the UE 120 (e.g., transmission from multiple TRPs, multi-panel transmission, etc.). The RS may be one or more of the following: secondary synchronization signal (SSS), demodulation reference signal (DMRS), channel state information reference signal (CSI-RS). For example, if the power offset between SSS and DMRS for PBCH is known by UE 120, both SSS and DMRS for PBCH of a synchronization signal (SS) block may be used as RS. In another example, if the power offset between SSS and DMRS for PBCH is not known by UE 120, SSS only of a SS block may be used as RS. In another example, a CSI-RS specific to UE 120 may be used. Any combination of RSs may further be used.

In certain aspects, the RS are received at UE 120 for a given transmit beam and PL is estimated/computed based on the transmit beam used for reception of the RS by the UE 120. In certain aspects, the PL estimation is a function of a beam pair link including a transmit beam of BS 110 used to transmit RS, and a receive beam of UE 120 used to receive RS. The PL estimation may be used for uplink power control for a transmit beam of the UE 120 associated with the beam pair link.

In certain aspects, the one or more parameters used for performing uplink control to be configured on a per beam basis may be a $P_0$ parameter and/or a compensation factor. In certain aspects, the BS 110 may be configured to configure the $P_0$ parameter and/or the compensation factor at the UE 120 by transmitting a message (e.g., in downlink control information (DCI) that points to a table configured by RRC or configured in UE 120, radio resource control (RRC) message (e.g., a dedicated message), or media access control-control element (MAC-CE)) indicating the $P_0$ parameter and/or the compensation factor to the UE 120. The UE 120 may then utilize the indicated $P_0$ parameter and/or the compensation factor for uplink power control, such as utilizing the equations discussed.

In certain aspects, a BS 110 may communicate with UE 120 (e.g., on the UL/DL) using one or more TRPs. For example, BS 110 may switch from communicating with UE 120 from a first TRP to a second TRP. The BS 110 may be configured to use the same identifier for communication from the TRPs (e.g., a physical cell identifier (PCI)), so the UE 120 may not be able to distinguish between transmission from the different TRPs. Further, the beam used for communicating with the UE 120 may change from the first TRP to the second TRP. Accordingly, in certain aspects, BS 110 determines an updated $P_0$ parameter and/or compensation factor for uplink power control for UE 120 when switching TRPs used for communication, and indicates the updated $P_0$ parameter and/or the update compensation factor to the UE 120.

In certain aspects, a BS 110 may transmit different types of RS to UE 120 for PL estimation as discussed. In certain aspects, the RS may be beam specific (e.g., based on a width of the beam). Accordingly, in certain aspects, BS 110 determines an updated $P_0$ parameter and/or compensation factor for uplink power control for UE 120 when switching RS type (e.g., from a first type to a second type, such as broad beam (e.g., NR-SS) to narrow beam (e.g., CSI-RS)) transmitted to UE 120, and indicates the updated $P_0$ parameter and/or the update compensation factor to the UE 120.

In certain aspects, BS 110 determines a different $P_0$ parameter and/or compensation factor for uplink power control for UE 120 for each beam pair link between the BS 110 and the UE 120. In certain aspects, one beam pair link may be designated a primary link and the remaining beam pair links may be designated as secondary links. In certain aspects, the BS 110 indicates the actual value for $P_0$ parameter and/or compensation factor for the primary link to the UE 120. In certain aspects, the BS 110 indicates an offset from the value for $P_0$ parameter and/or compensation factor for the primary link indicated for each of the secondary links. For example, the UE 120 may utilize the offset for a secondary link and the value of the primary link (e.g., sum of the two) to determine the value for $P_0$ parameter and/or compensation factor to use for the secondary link.

In certain aspects, a BS 110 may communicate with UE 120 (e.g., on the UL/DL) using a first beam and then may switch from communicating with UE 120 using the first beam to a second beam. In certain aspects, if the first beam and the second beam are QCLed (quasi-co-located), the BS 110 may indicate to the UE 120 to use the same $P_0$ parameter and/or compensation factor as used for the first beam for the second beam. In certain aspects, the BS 110 may determine and indicate to the UE 120 to use a different $P_0$ parameter and/or compensation factor for the second beam.

In certain aspects, a BS 110 may transmit RS (e.g., CSI-RS) on a plurality of resources (e.g., resource blocks (RBs), frequency resources, etc.) to UE 120. These different resources may be used to transmit on the uplink by the UE 120. In certain aspects, the plurality of resources are divided into a plurality of different subsets of the plurality of resources (e.g., different resource(s) in each subset). In certain aspects, BS 110 determines different $P_0$ parameters and/or compensation factors to use for performing uplink control for each of the different subsets and indicates these to the UE 120 for power control for transmission on the different subsets. In certain aspects, the BS 110 indicates the actual value for $P_0$ parameter and/or compensation factor for a primary subset to the UE 120. In certain aspects, the BS 110 indicates an offset from the value for $P_0$ parameter and/or compensation factor for the primary subset indicated for each of the remaining subsets. In certain aspects, different subsets may be used for communication with different TRPs of BS 110.

In certain aspects, the one or more parameters used for performing uplink control to be configured on a per beam basis may be a step size (e.g., indicated in a TPC command) for changing a power level used for transmitting by the UE 120 on the uplink. In certain aspects, BS 110 determines the step size based on beam width (e.g., narrow or broad, such as a larger step size for narrower beams and a smaller step size for broader beams due to the fast change of beamforming gain of narrow beam) of the beam and transmits an indication of the step size to UE 120, which uses the step size indicated for uplink power control for the beam. In some aspects, BS 110 indicates a default step size to use for all beams at UE 120, and further indicates different step sizes for beams as needed.

In certain aspects, the one or more parameters used for performing uplink control to be configured on a per beam basis may be PL estimate for a path between the UE 120 and the BS 110. In certain aspects, BS 110 is configured to group a number of beams (e.g., NR-SS or CSI-RS) to transmit RS to UE 120 to use for PL estimation. In certain aspects, the BS 110 indicates in a message to UE 120 a function to use based on the RS for PL estimation. For example, the function may be a maximum, average, etc. of a RSRP of one or more of the beams.

In certain aspects, BS 110 may configure UE 120 to apply PL filtering based on the PL estimate for uplink power control by transmitting an indication in a message to UE 120. In certain aspects, a BS 110 may communicate with UE 120 (e.g., on the UL/DL) using a first beam and then may switch from communicating with UE 120 using the first beam to a second beam. Based on the switch, the BS 110 may configure UE 120 to reset PL filtering by deleting a history associated with the path loss history by transmitting an indication in a message to UE 120.

In certain aspects, the one or more parameters used for performing uplink control to be configured on a per beam basis may be a function (e.g., f(i), g(i), etc.) for closed loop control for changing a power level used for transmitting by the UE 120 on the uplink based on feedback from the BS 110. In certain aspects, the closed loop control is updated to maintain received power at the BS 110 (e.g., during a $P_2$ and $P_3$ procedure). In certain aspects (e.g., in a $P_1$ procedure), if BS 110 indicates to UE 120 a new $P_0$ parameter to use for uplink power control, the BS 110 may further indicate to UE 120 to reset the closed loop control to 0 for the next subframe or use the previous closed loop control value for the next subframe. In certain aspects, if BS 110 does not indicate to UE 120 to use a new $P_0$ parameter, the BS 110 may indicate to UE 120 to use the next closed loop control value or use the previous closed loop control value for the next subframe or update to maintain received power at the BS 110.

Figure 8:
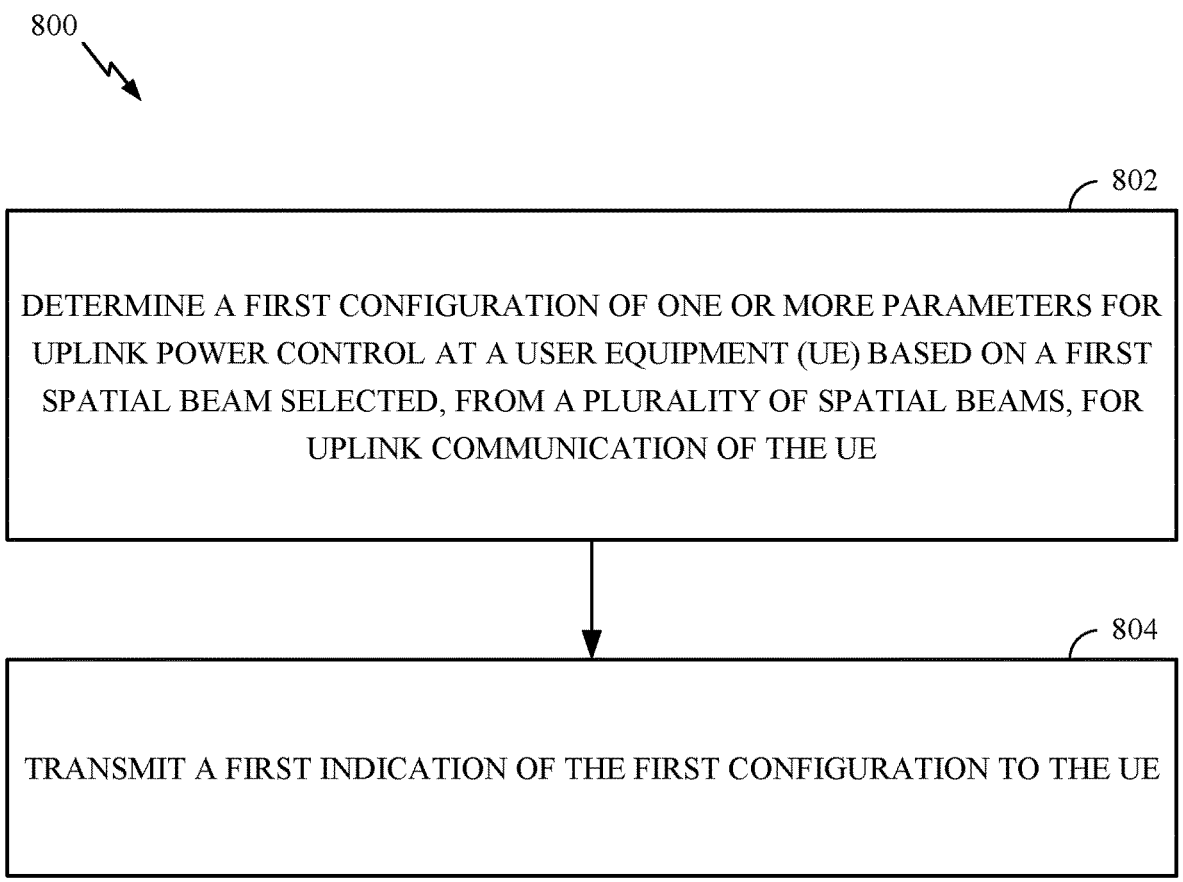
FIG. 8 illustrates example operations for uplink power control for a UE, in accordance with certain aspects.

FIG. 8 illustrates example operations 800 for uplink power control for a UE, in accordance with certain aspects. According to certain aspects, operations 800 may be performed by a BS (e.g., one or more of the BSs 110).

Operations 800 begin at 802 where the BS determines a first configuration of one or more parameters for uplink power control at a user equipment (UE) based on a first spatial beam selected, from a plurality of spatial beams, for uplink communication of the UE. At 804, the BS transmits a first indication of the first configuration to the UE.

Figure 9:
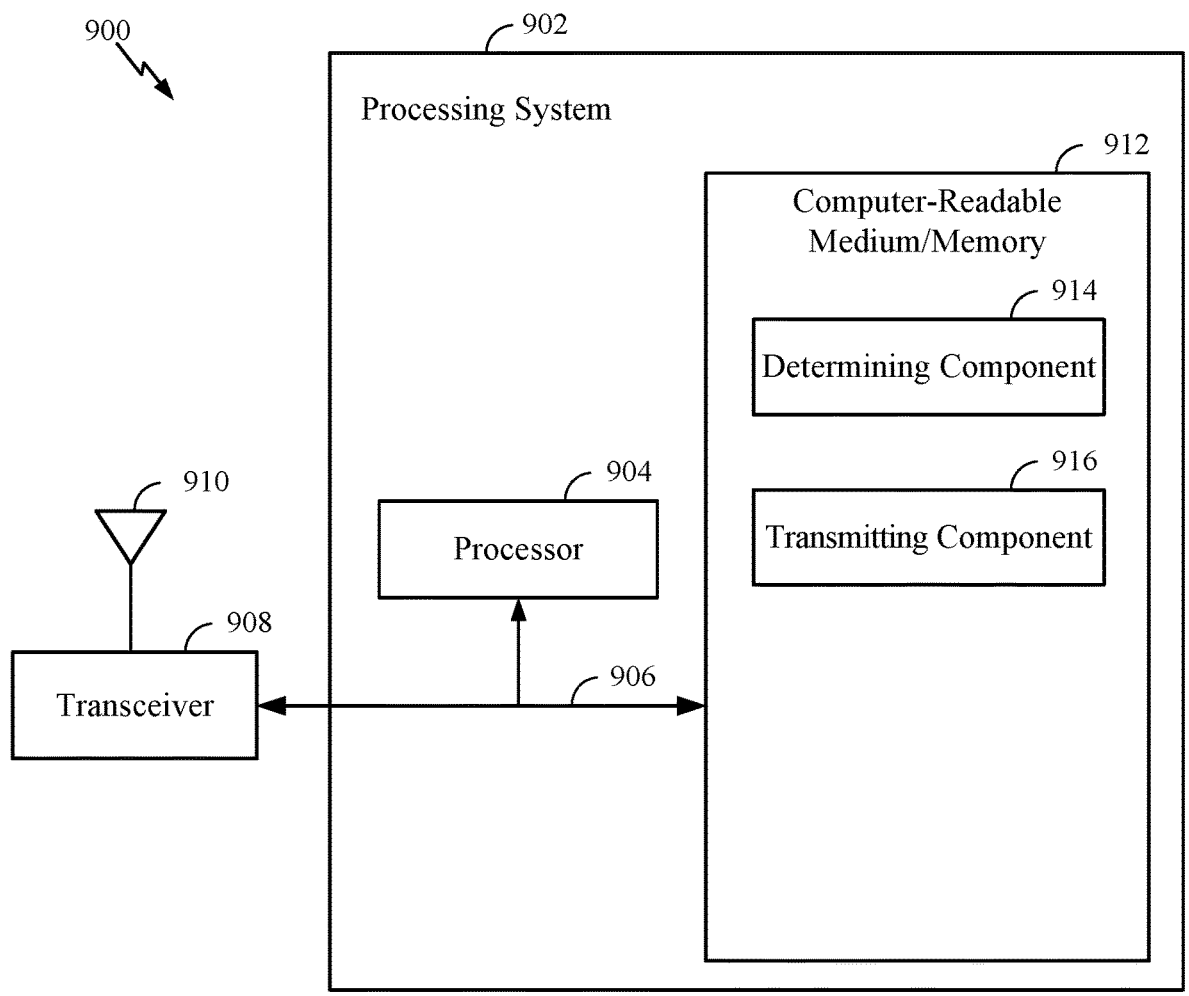
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 8. The communications device 900 includes a processing system 902 coupled to a transceiver 908. The transceiver 908 is configured to transmit and receive signals for the communications device 900 via an antenna 910, such as the various signal described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions that when executed by processor 904, cause the processor 904 to perform the operations illustrated in FIG. 8, or other operations for performing the various techniques discussed herein.

In certain aspects, the processing system 902 further includes a determining component 914 for performing the operations illustrated in 802 of FIG. 8. Additionally, the processing system 902 includes a transmitting component 916 for performing the operations illustrated in 804 of FIG. 8. The determining component 914 and transmitting component 916 may be coupled to the processor 904 via bus 906. In certain aspects, the determining component 914 and transmitting component 916 may be hardware circuits. In certain aspects, the determining component 914 and transmitting component 916 may be software components that are executed and run on processor 904.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for allocating, and/or means for determining may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/ or encoded) thereon, the instructions being executable by one or more processors to perform the operations described herein. For example, instructions for perform the operations described herein and illustrated in FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for performing uplink power control at a base station (BS), the method comprising:
    determining a switch of a user equipment (UE) from using a first reference signal received by the UE from the BS for uplink power control to a second reference signal;
    determining a first configuration of one or more parameters for uplink power control at the UE based on the switch, wherein the second reference signal is associated with the first configuration, and the first reference signal is associated with a second configuration of the one or more parameters that is different than the first configuration; and
    transmitting a first indication of the first configuration to the UE.

2. The method of claim 1, wherein the one or more parameters comprise a target received power at the BS for signals sent from the UE to the BS on the uplink.

3. The method of claim 1, wherein the one or more parameters comprise a compensation factor.

4. The method of claim 1, wherein the BS comprises a plurality of transmission reception points (TRPs) for communicating with the UE, each of the TRPs being configured to use a same identifier for communications, and further comprising:
    determining a second switch of the UE from communicating with a first TRP of the plurality of TRPs to a second TRP of the plurality of TRPs;
    determining an updated configuration of the one or more parameters based on the second switch; and
    transmitting a second indication of the updated configuration to the UE.

5. The method of claim 1, wherein the first configuration is used for uplink power control by the UE on a first spatial beam of a plurality of spatial beams, and further comprising:
    determining a third configuration of the one or more parameters for uplink power control at the UE based a second spatial beam selected, from the plurality of spatial beams, for uplink communications of the UE, wherein the third configuration is used for uplink power control by the UE on the second spatial beam; and
    transmitting a second indication of the third configuration to the UE, wherein the second indication of the third configuration indicates an offset between the first configuration of the one or more parameters and the third configuration.

6. The method of claim 1, wherein the first configuration is used for uplink power control by the UE on a first spatial beam of a plurality of spatial beams, and further comprising:
    determining to use the first configuration of the one or more parameters for uplink power control at the UE for a second spatial beam of the plurality of spatial beams, wherein the first spatial beam and the second spatial beam are quasi-co-located; and
    transmitting a second indication to the UE to use the first configuration for the second spatial beam.

7. The method of claim 1, wherein the one or more parameters comprise a step size for changing a power level used for transmitting by the UE.

8. The method of claim 7, wherein the step size is based on a width of the first spatial beam.

9. The method of claim 1, wherein the one or more parameters comprise a path loss estimate for a path between the UE and the BS, and further comprising:
    transmitting a plurality of different reference signals on a plurality of spatial beams to the UE from the BS, wherein the first indication indicates a function to apply to all of the plurality of different reference signals at the UE to determine the path loss estimate.

10. The method of claim 9, further comprising:
    transmitting a second indication to the UE to perform path loss filtering based on the path loss estimate;
    determining a second switch of the UE from using a first spatial beam to a second spatial beam; and
    transmitting a third indication to the UE to reconfigure path loss filtering based on the second switch.

11. The method of claim 1, further comprising:
    determining a second switch of the UE from using a second spatial beam to a first spatial beam, wherein the one or more parameters comprise a function for closed loop control for changing a power level used for transmitting by the UE based on feedback from the BS, and wherein the first indication indicates to reset the function to zero or use a function used for the second spatial beam for the first spatial beam.

12. A base station (BS) comprising:
    a memory; and
    a processor coupled to the memory, the processor being configured to:
        determine a switch of a user equipment (UE) from using a first reference signal received by the UE from the BS for uplink power control to a second reference signal;
        determine a first configuration of one or more parameters for uplink power control at the UE based on the switch, wherein the second reference signal is associated with the first configuration, and the first reference signal is associated with a second configuration of the one or more parameters that is different than the first configuration; and
        transmit a first indication of the first configuration to the UE.

13. The base station of claim 12, wherein the one or more parameters comprise a target received power at the BS for signals sent from the UE to the BS on the uplink.

14. The base station of claim 12, wherein the one or more parameters comprise a compensation factor.

15. The base station of claim 12, wherein the BS comprises a plurality of transmission reception points (TRPs) for communicating with the UE, each of the TRPs being configured to use a same identifier for communications, and wherein the processor is further configured to:
 determine a second switch of the UE from communicating with a first TRP of the plurality of TRPs to a second TRP of the plurality of TRPs;
 determine an updated configuration of the one or more parameters based on the second switch; and
 transmit a second indication of the updated configuration to the UE.

16. The base station of claim 12, wherein the first configuration is used for uplink power control by the UE on a first spatial beam of a plurality of spatial beams, and wherein the processor is further configured to:
 determine a third configuration of the one or more parameters for uplink power control at the UE based a second spatial beam selected, from the plurality of spatial beams, for uplink communications of the UE, wherein the third configuration is used for uplink power control by the UE on the second spatial beam; and
 transmit a second indication of the third configuration to the UE, wherein the second indication of the third configuration indicates an offset between the first configuration of the one or more parameters and the third configuration.

17. The base station of claim 12, wherein the first configuration is used for uplink power control by the UE on a first spatial beam of a plurality of spatial beams, and wherein the processor is further configured to:
 determine to use the first configuration of the one or more parameters for uplink power control at the UE for a second spatial beam of the plurality of spatial beams, wherein the first spatial beam and the second spatial beam are quasi-co-located; and
 transmit a second indication to the UE to use the first configuration for the second spatial beam.

18. The base station of claim 12, wherein the one or more parameters comprise a step size for changing a power level used for transmitting by the UE.

19. The base station of claim 18, wherein the step size is based on a width of the first spatial beam.

20. The base station of claim 12, wherein the one or more parameters comprise a path loss estimate for a path between the UE and the BS, and wherein the processor is further configured to:
 transmit a plurality of different reference signals on a plurality of spatial beams to the UE from the BS, wherein the first indication indicates a function to apply to all of the plurality of different reference signals at the UE to determine the path loss estimate.

21. The base station of claim 20, wherein the processor is further configured to:
 transmit a second indication to the UE to perform path loss filtering based on the path loss estimate;
 determine a second switch of the UE from using a first spatial beam to a second spatial beam; and
 transmit a third indication to the UE to reconfigure path loss filtering based on the second switch.

22. The base station of claim 12, wherein the processor is further configured to:
 determine a second switch of the UE from using a second spatial beam to a first spatial beam, wherein the one or more parameters comprise a function for closed loop control for changing a power level used for transmitting by the UE based on feedback from the BS, and wherein the first indication indicates to reset the function to zero or use a function used for the second spatial beam for the first spatial beam.

23. A base station (BS) comprising:
 means for determining a switch of a user equipment (UE) from using a first reference signal received by the UE from the BS for uplink power control to a second reference signal;
 means for determining a first configuration of one or more parameters for uplink power control at the UE based on the switch, wherein the second reference signal is associated with the first configuration, and the first reference signal is associated with a second configuration of the one or more parameters that is different than the first configuration; and
 means for transmitting a first indication of the first configuration to the UE.

24. The base station of claim 23, wherein the one or more parameters comprise a target received power at the BS for signals sent from the UE to the BS on the uplink.

25. The base station of claim 23, wherein the one or more parameters comprise a compensation factor.

26. A non-transitory computer readable storage medium that stores instructions that when executed by a base station (BS) causes the base station to perform a method for performing uplink power control at the BS, the method comprising:
 determining a switch of a user equipment (UE) from using a first reference signal received by the UE from the BS for uplink power control to a second reference signal;
 determining a first configuration of one or more parameters for uplink power control at the UE based on the switch, wherein the second reference signal is associated with the first configuration, and the first reference signal is associated with a second configuration of the one or more parameters that is different than the first configuration; and
 transmitting a first indication of the first configuration to the UE.

27. The non-transitory computer readable storage medium of claim 26, wherein the one or more parameters comprise a target received power at the BS for signals sent from the UE to the BS on the uplink.

28. The non-transitory computer readable storage medium of claim 26, wherein the one or more parameters comprise a compensation factor.

* * * * *